US005119556A

United States Patent [19]

Hseu

[11] Patent Number: 5,119,556

[45] Date of Patent: Jun. 9, 1992

[54] TOOL FOR REMOVAL OF FAUCET STEM AND CARTRIDGE

[76] Inventor: Wanlie P. Hseu, 3123 Via Loma Vista, Escondido, Calif. 92029

[21] Appl. No.: 706,419

[22] Filed: May 28, 1991

[51] Int. Cl.5 .............................................. B23P 19/04

[52] U.S. Cl. .................................... 29/264; 29/213.1; 29/240; 269/8

[58] Field of Search ....................... 269/8; 29/269, 263, 29/270, 213.1, 240, 264, 280, 281

[56] References Cited

U.S. PATENT DOCUMENTS

| | | | |
|---|---|---|---|
| 2,036,782 | 4/1936 | Ullmo | 29/88.2 |
| 3,872,569 | 3/1975 | Lane | 29/257 |
| 4,079,494 | 3/1978 | Sutton et al. | 29/280 |
| 4,084,305 | 4/1978 | Chang | 29/261 |
| 4,123,838 | 11/1978 | Magauero | 29/261 |
| 4,274,189 | 6/1981 | Conover | 29/256 |
| 4,694,569 | 9/1987 | Colvell | 29/724 |
| 4,823,453 | 4/1989 | Bartlett | 29/261 |

*Primary Examiner*—Bruce M. Kisliuk
*Assistant Examiner*—Eileen Morgan
*Attorney, Agent, or Firm*—Calif Kip Tervo

[57] ABSTRACT

A tool for removing a faucet stem and cartridge from a faucet body; the stem of the type having a threaded outer end; the cartridge of the type having a central bore retaining the stem; the bore including an inward facing ledge. A cylindrical standoff sleeve has an inner end for bearing against the faucet body. A rod passes through the standoff sleeve. The rod has, on its very inner end, threads for engaging the stem threads and, above that, a device for engaging a cartridge inward facing ledge. Rod outer end includes a threaded section. A rotatable handle threads on the rod outer end and bears against the standoff sleeve outer end such that rotation of the handle moves the rod axially relative to the standoff sleeve for extracting the stem and cartridge after engagement. The cartridge extraction device is an irregular, substantially planar washer mounted on the rod such that the washer may rotate between an insertion position wherein the plane of the washer is non-normal to the cartridge bore axis such that the washer fits inside the bore and an ledge engaging position wherein the plane of the washer is normal to the cartridge bore axis. A washer insertion sleeve moves on the rod and includes on its inner end a magnet for biasing the washer in the insertion position.

9 Claims, 1 Drawing Sheet

TOOL FOR REMOVAL OF FAUCET STEM AND CARTRIDGE

BACKGROUND OF THE INVENTION

1. Field of the Invention

This invention is a tool for removing the stem and cartridge of a faucet from the faucet body for maintenance, repair, or replacement and more particularly involves a tool for the removal of the stem and cartridge of Moen type faucets.

2. Background Art

A single control faucet uses one operating device, such as a knob or lever, to control both the water volume and the hot/cold mix. Many single control faucets include as major components a cylindrical outer cartridge having a central bore and a movable stem that is disposed in the cartridge central bore. The stem includes thread on its outer end and the cartridge bore includes various grooves and inward facing ledges. The cartridge is held in a pipe by a retainer clip and or seals. The seals are typically of the O-ring type. Typically, the stem is similarly held in the cartridge bore. Typically, in and out movement of the stem controls the total flow rate while rotation of the stem controls the mix of hot and cold water. A common faucet of this type is called a Moen faucet.

For maintenance, repair, or replacement of a Moen faucet, the stem and cartridge need to be extracted from the faucet body. A conventional tool for removal of the stem and cartridge includes a threaded rod for engaging threads on the exposed outer end of the stem. The rod is then pulled on to pull out the stem from the cartridge bore. To remove the cartridge, first the stem is removed. Another rod is used to extract the cartridge. The cartridge extraction rod has a sidewards facing spring biased detent button o its lower end. The rod is inserted into the cartridge bore until the outwardly biased button engages a recesses in the bore. The cartridge is then pulled out by hand.

Often, the stem and cartridge are not easily pulled out by hand or simply cannot be pulled out by hand. This is particularly true, if they are broken, old, or heavily corroded.

Therefore, there has been a need for a faucet stem and cartridge removal tool that uses an extraction force other than pulling by hand.

It is also desirable that the new tool be simple to us and compact.

DETAILED DESCRIPTION OF THE INVENTION

Figure 2:
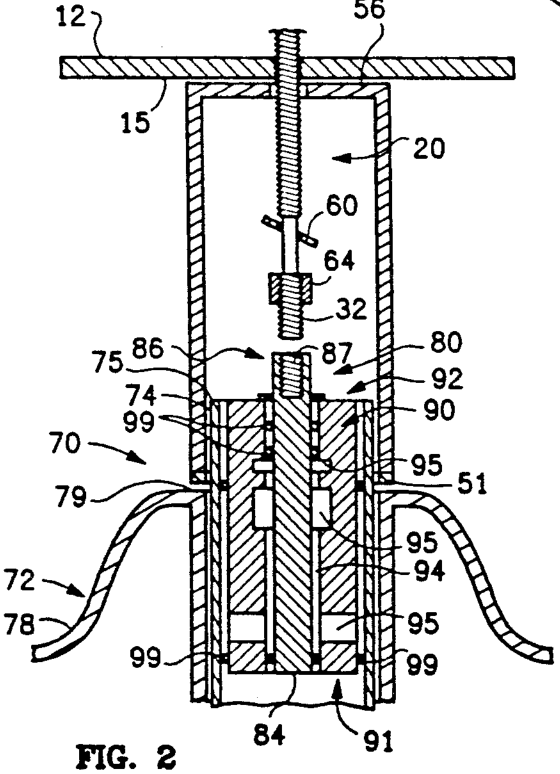
FIG. 2 is a vertical cross sectional view of the tool in position on a faucet body for removal of the stem.

With reference now to the drawing, and first to the FIG. 2 thereof, there is shown in vertical cross section a simplified version of a typical single control faucet, denoted generally as 70. Starting at the center, faucet 70 includes in general, a stem, denoted generally as 80, a cartridge, denoted generally as 90, and a faucet body, denoted generally as 72, that includes the elements outside of cartridge 90 including housing pipe 74 and casing 78. Pipe 74 has a circular end face 75. Casing 78 has a circular end face 79 adjacent pipe 74.

Cartridge 90 is cylindrical and has an inner end 91, an outer end 92 and a centralized bore 94 therebetween. Various seals, such as O-rings 99, seal between cartridge 90 and housing pipe 74 and between cartridge 90 and stem 80. Typically, a retainer clip (not shown) joins cartridge 90 to body 72 and must be removed before extraction of cartridge 90. Central bore 94 includes a number of recesses or annular grooves 95. These, plus the face of inner end 91 provide a plurality of inward facing ledges adjacent bore 94.

Stem 80 is contained in bore 94 and includes an inner end 84 and an outer end B6 that is threaded, such as by threaded internal recess 87.

Figure 1:
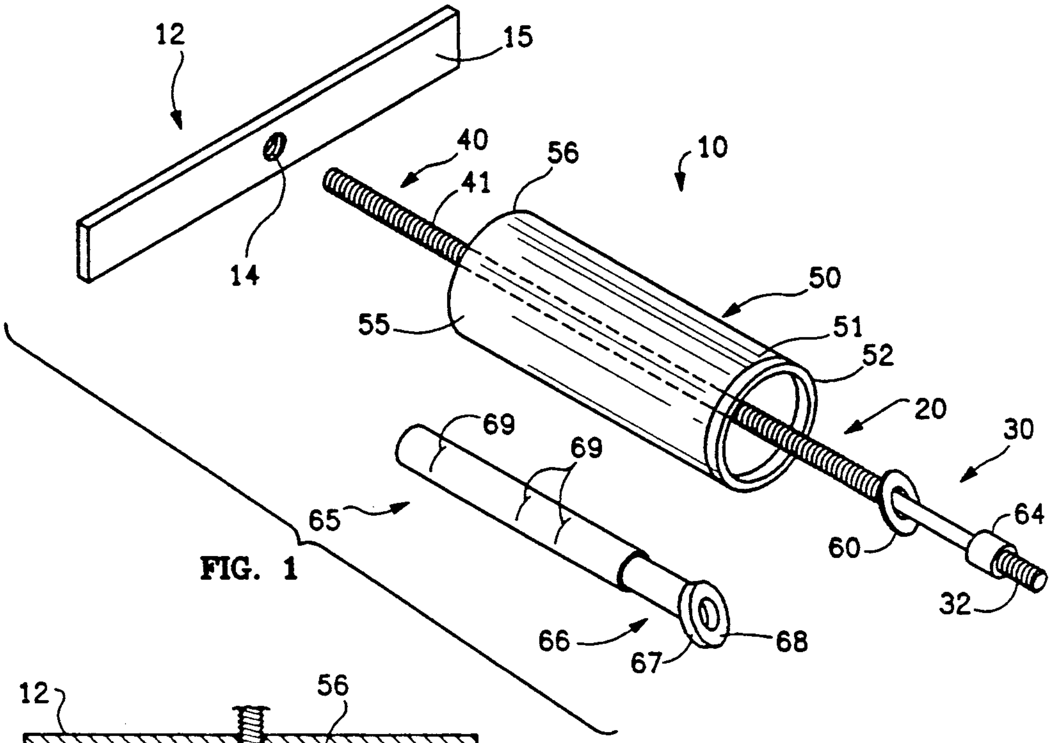
FIG. 1 is a perspective view of the faucet stem and cartridge removal tool of the invention showing, for clarity, the washer insertion sleeve removed from the rod.

Turning now to FIG. 1, there is shown a perspective view of the faucet stem and cartridge removal tool , denoted generally as 10 of the invention.

A rod means, denoted generally as 20, has an inner end portion, denoted generally as 30 and an outer end portion denoted generally as 40. Rod outer end portion 40 includes a threaded portion 41. Rod inner end portion 30 has an outside diameter smaller than cartridge bore 94 for fitting in the cartridge bore 94. Inner end portion 30 includes means, such as external threads 32 on the terminal end, for engaging stem threads 87. Rod 20 is must be strong in tension and is made of metal.

A cylindrical standoff sleeve, denoted generally as 50, fits around rod 20 and has an inner end terminating in inner end face 52 and an outer end 55 terminating in outer end face 56. Standoff sleeve 50 has an inside diameter greater than the outside diameter of cartridge 90 such that inner end face 52 can seat against an end face of faucet body 70 such as against pipe end face 75 or, preferably, against casing end face 79. Preferably, standoff sleeve end face 52 has a non-maring coating or overlay so as to not damage a faucet body end face.

Screw handle 12 includes a threaded bore !4 for threaded engagement with rod outer end threaded portion 41 and an inner face 15 for bearing against standoff sleeve outer face 56.

Turning once more to FIG. 2, tool 10 is shown in position for removal of stem 80. Rod threaded inner end 32 is screwed clockwise into stem threads 87. Standoff sleeve 50 is placed over rod 20 with inner end face 52 bearing against case end face 79. Handle 12 is threaded, by turning clockwise, down rod 20 until inner face 15 contacts standoff sleeve outer face 56. Further rotation of handle 12 then moves rod 20 outward and extracts stem 80 from cartridge bore 94. Standoff sleeve 50 should be sufficiently long to permit total or significant extraction of stem 80 so that little or n further pulling by hand is required.

Looking again at FIG. 1, rod inner end 30 also includes means, such as irregular washer 60, for engaging an inward facing ledge of cartridge bore 94 for extracting cartridge 90. In the preferred embodiment shown, washer 60 is planar and elliptical with a major dimension greater than the diameter of bore 94 and a minor diameter less than the diameter of bore 94. Washer 60 is mounted on rod 20 such that washer 60 may rotate between an insertion position wherein the plane of washer 60 is non-normal to the axis of cartridge bore 94 such that washer 60 fits inside of bore 94 to an engaging position wherein the plane of the washer is normal to the axis of cartridge bore 94. A slightly elliptical or oversized washer bore will serve this purpose. During extraction of cartridge 90, washer 60 may be retained on rod 20 by threads 32 or may be retained a described below.

In the preferred embodiment shown, washer 60 is free to move over at least a range of rod 20 and a washer stop 64 is provided to retain washer 60 on the rod 20 during cartridge extraction. Stop 64 will fit within cartridge bore 94 and has a flat upper surface providing means for aligning washer 60 normal to the bore axis and for supporting washer 60 near the periphery of the bore 94 for added strength.

Means, such as insertion sleeve, denoted generally as 65, biases washer 60 in the angled position during insertion of washer 60 into bore 94. Insertion sleeve 65 is a hollow cylinder having an inside diameter for sliding over rod 20 and a outside diameter for fitting within bore 94. On the inner end 66 of insertion sleeve 65 is a magnet 67 having an inner face 68 for retaining washer 60 and an angle that allows insertion into bore 94. Pushing washer 60 against stop 64 by insertion sleeve 65 will rotate washer 60 to the normal position in bore 94. Markers 69 on insertion sleeve 65 indicate the distances sleeve 65 should be inserted into bore 94 where washer 60 can be rotated to the normal position for engaging a bore inward facing. To engage washer 60 under a ledge, rod 20 is inserted in bore 94, insertion sleeve 65 with attached washer 60 is slid down rod 20 to a marker, and rod 20 retracted so that stop 64 rotates washer 60. After extraction of cylinder 90, washer 60 is easily recalled from bore 94 by using sleeve 65 with magnet 67 to return washer 60 to the angled position. Other means may be used to hold washer 60 at an angled position during insertion. For example, the washer 60 can be held at an angle by a friction internal fit on an internal rubber or plastic mount or small detent springs or balls may be used.

Figure 3:
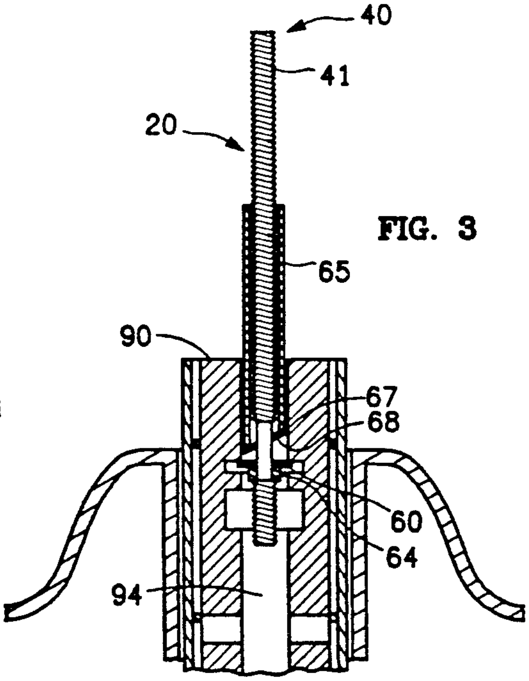
FIG. 3 is a vertical cross sectional view of the faucet showing the tool engaging the cartridge for removal.

Referring now to FIG. 3, there is shown a cross-sectional view of faucet 70 as in FIG. 2 except with stem 80 removed. Insertion sleeve 6 has just deposited washer 60 in the engaged position shown. Washer 60 engages the inward facing ledge on diametrically opposed locations. Washer 60 can also engage the ledge of cartridge inner end. Insertion sleeve 65 is now removed and standoff sleeve 50 and handle 12 are applied as shown in FIG. 2 to extract cylinder 90.

From the foregoing description it is seen that the invention provides an extremely simple, efficient, and reliable manner of extracting the stem and cartridge of a faucet.

Although a particular embodiment of the invention has been illustrated and described, various changes may be made in the form, composition, construction, and arrangement of the parts without sacrificing any of its advantages. Therefore, it is to be understood that all matter herein is to be interpreted and illustrative and not in any limiting sense and it is intended to cover in the appended claims such modifications as come within the true spirit and scope of the invention.

I claim:

1. A tool for removing a stem and cartridge faucet from a faucet body; the stem of the type having an inner end and a threaded outer end; the cartridge of the type having an inner end, an outer end, and a bore therebetween retaining the stem; the bore having an axis and including an inward facing ledge; said tool comprising:
- cylindrical sleeve means having an inside diameter greater than the outside diameter of the cartridge; said sleeve means including:
  - an outer end; and
  - an inner end including an end face for bearing against the faucet body; and
- a rod for passing through said sleeve including:
  - an inner end having an outside diameter smaller than the cartridge bore including:
    - thread means for engaging the stem threaded outer end for removal of the stem from the cartridge; and
    - ledge engaging means for engaging the cartridge inward facing ledge for removal of the cartridge from the body; and
  - an outer end including a threaded section;
- rotatable handle means for threadable engagement with said rod outer end threaded section and for bearing against said sleeve outer end; such that when said handle means threadably engages said rod and bears against said sleeve, rotation of said handle relative to said rod moves said rod axially relative to said sleeve such that, when said thread means is engaged with the stem threaded outer end, outward axial movement of said rod extracts the faucet stem from the faucet cartridge and such that, when said ledge engaging means is engaged with the cartridge inward facing ledge, outward axial movement of said rod extracts the faucet cartridge from the faucet body.

2. The tool of claim 1 wherein:
said rod inner end thread means for engaging the stem includes:
a terminal externally threaded portion for engaging internal threads on the stem outer end.

3. The tool of claim 1 wherein:
said ledge engaging means for engaging the cartridge inward facing ledge includes:
expansion means for engaging the ledge at diametrically opposed positions.

4. The tool of claim 1 wherein:
said ledge engaging means for engaging the cartridge inward facing ledge includes:
- an irregular, substantially planar washer having a major dimension greater than the cartridge bore diameter and a minor dimension less than the cartridge bore diameter; said washer mounted on said rod above said inner end thread means such that said washer may rotate between an insertion position wherein the plane of said washer is non-normal to the cartridge bore axis such that said washer fits inside the bore and an engaging position wherein the plane of said washer is normal to the cartridge bore axis.

5. The tool of claim 4 wherein:
said washer is slidably mounted on said rod.

6. The tool of claim 5 including:
washer engagement alignment means mounted on said rod below said washer.

7. The tool of claim 4 including:
washer biasing means for holding said washer in an angled position for insertion into the cartridge bore.

8. The tool of claim 4 including:
washer insertion sleeve means for mounting on said rod for axial movement on said rod for contacting said washer including:
- an upper end; and
- a lower end including:
  - means for biasing said washer in the insertion position.

9. The tool of claim 8 wherein:
said washer is ferrous and said biasing means is a magnet.

* * * * *